(12) United States Patent
Wu et al.

(10) Patent No.: US 6,599,650 B2
(45) Date of Patent: Jul. 29, 2003

(54) FUEL CELL SEALANT DESIGN

(75) Inventors: Yaobang Wu, Latham, NY (US); Milton H. Nelson, Clifton Park, NY (US)

(73) Assignee: Plug Power, Inc., Latham, NY (US)

( * ) Notice: Subject to any disclaimer, the term of this patent is extended or adjusted under 35 U.S.C. 154(b) by 141 days.

(21) Appl. No.: 09/843,522

(22) Filed: Apr. 27, 2001

(65) Prior Publication Data

US 2002/0160244 A1 Oct. 31, 2002

(51) Int. Cl.[7] .......................... H01M 8/04; H01M 8/12; H01M 2/00; H01M 2/02; H01M 2/14
(52) U.S. Cl. .................... 429/26; 429/34; 429/38; 429/39
(58) Field of Search .............................. 429/12, 13, 17, 429/26, 34, 35, 38, 39

(56) References Cited

U.S. PATENT DOCUMENTS

| | | | | |
|---|---|---|---|---|
| 5,470,671 A | * | 11/1995 | Fletcher et al. | 429/26 |
| 5,486,430 A | * | 1/1996 | Gorbell et al. | 429/35 |
| 5,773,160 A | * | 6/1998 | Wilkinson et al. | 429/13 |
| 5,976,726 A | * | 11/1999 | Wilkinson et al. | 429/35 |
| 6,232,006 B1 | * | 5/2001 | Breault | 429/26 |
| 6,350,538 B1 | * | 2/2002 | Wilkinson et al. | 429/32 |
| 6,403,247 B1 | * | 6/2002 | Guthrie et al. | 429/34 |
| 6,475,651 B1 | * | 11/2002 | Wilkinson et al. | 429/13 |

\* cited by examiner

*Primary Examiner*—Randy Gulakowski
*Assistant Examiner*—Donald V. Scaltrito
(74) *Attorney, Agent, or Firm*—Fish & Richardson, P.C.

(57) ABSTRACT

Sealant designs for fuel cells, as well as fuel cell systems and methods using such sealant designs, are disclosed.

51 Claims, 15 Drawing Sheets

FUEL CELL SEALANT DESIGN

TECHNICAL FIELD

The invention relates to sealant designs for fuel cells, as well as fuel cell systems and methods using such sealant designs.

BACKGROUND

A fuel cell can convert chemical energy to electrical energy by promoting a chemical reaction between two gases.

One type of fuel cell includes a cathode flow field plate, an anode flow field plate, a membrane electrode assembly (commonly abbreviated MEA) disposed between the cathode flow field plate and the anode flow field plate, and two gas diffusion layers (commonly abbreviated GDLs) disposed between the cathode flow field plate and the anode flow field plate. A fuel cell can also include one or more coolant flow field plates disposed adjacent the exterior of the anode flow field plate and/or the exterior of the cathode flow field plate.

Each flow field plate has an inlet region, an outlet region and open-faced channels connecting the inlet region to the outlet region and providing a way for distributing the gases to the membrane electrode assembly.

The membrane electrode assembly usually includes a solid electrolyte (e.g., a proton exchange membrane, commonly abbreviated as a PEM) between a first catalyst and a second catalyst. One gas diffusion layer is between the first catalyst and the anode flow field plate, and the other gas diffusion layer is between the second catalyst and the cathode flow field plate.

During operation of the fuel cell, one of the gases (the anode gas) enters the anode flow field plate at the inlet region of the anode flow field plate and flows through the channels of the anode flow field plate toward the outlet region of the anode flow field plate. The other gas (the cathode gas) enters the cathode flow field plate at the inlet region of the cathode flow field plate and flows through the channels of the cathode flow field plate toward the cathode flow field plate outlet region.

As the anode gas flows through the channels of the anode flow field plate, the anode gas passes through the anode gas diffusion layer and interacts with the anode catalyst. Similarly, as the cathode gas flows through the channels of the cathode flow field plate, the cathode gas passes through the cathode gas diffusion layer and interacts with the cathode catalyst.

The anode catalyst interacts with the anode gas to catalyze the conversion of the anode gas to reaction intermediates. The reaction intermediates include ions and electrons. The cathode catalyst interacts with the cathode gas and the reaction intermediates to catalyze the conversion of the cathode gas to the chemical product of the fuel cell reaction.

The chemical product of the fuel cell reaction flows through a gas diffusion layer to the channels of a flow field plate (e.g., the cathode flow field plate). The chemical product then flows along the channels of the flow field plate toward the outlet region of the flow field plate.

The electrolyte provides a barrier to the flow of the electrons and gases from one side of the membrane electrode assembly to the other side of the membrane electrode assembly. However, the electrolyte allows ionic reaction intermediates to flow from the anode side of the membrane electrode assembly to the cathode side of the membrane electrode assembly.

Therefore, the ionic reaction intermediates can flow from the anode side of the membrane electrode assembly to the cathode side of the membrane electrode assembly without exiting the fuel cell. In contrast, the electrons flow from the anode side of the membrane electrode assembly to the cathode side of the membrane electrode assembly by electrically connecting an external load between the anode flow field plate and the cathode flow field plate. The external load allows the electrons to flow from the anode side of the membrane electrode assembly, through the anode flow field plate, through the load and to the cathode flow field plate.

Electrons are formed at the anode side of the membrane electrode assembly, indicating that the anode gas undergoes oxidation during the fuel cell reaction. Electrons are consumed at the cathode side of the membrane electrode assembly, indicating that the cathode gas undergoes reduction during the fuel cell reaction.

For example, when hydrogen and oxygen are the gases used in a fuel cell, the hydrogen flows through the anode flow field plate and undergoes oxidation. The oxygen flows through the cathode flow field plate and undergoes reduction. The specific reactions that occur in the fuel cell are represented in equations 1–3.

$$H_2 \rightarrow 2H^+ + 2e^- \tag{1}$$

$$O_2 + 2H^+ + 2e^- \rightarrow H_2O \tag{2}$$

$$H_2 + O_2 \rightarrow H_2O \tag{3}$$

As shown in equation 1, the hydrogen forms protons ($H^+$) and electrons. The protons flow through the electrolyte to the cathode side of the membrane electrode assembly, and the electrons flow from the anode side of the membrane electrode assembly to the cathode side of the membrane electrode assembly through the external load. As shown in equation 2, the electrons and protons react with the oxygen to form water. Equation 3 shows the overall fuel cell reaction.

In addition to forming chemical products, the fuel cell reaction produces heat. One or more coolant flow field plates are typically used to conduct the heat away from the fuel cell and prevent it from overheating.

Each coolant flow field plate has an inlet region, an outlet region and channels that provide fluid communication between the coolant flow field plate inlet region and the coolant flow field plate outlet region. A coolant at a relatively low temperature enters the coolant flow field plate at the inlet region, flows through the channels of the coolant flow field plate toward the outlet region of the coolant flow field plate, and exits the coolant flow field plate at the outlet region of the coolant flow field plate. As the coolant flows through the channels of the coolant flow field plate, the coolant absorbs heat formed in the fuel cell. When the coolant exits the coolant flow field plate, the heat absorbed by the coolant is removed from the fuel cell. Typically, the coolant is eventually circulated through a coolant loop external to the fuel cell where its temperature is reduced. The coolant is then recirculated through the coolant flow field plate.

To increase the electrical energy available, a plurality of fuel cells can be arranged in series to form a fuel cell stack. In a fuel cell stack, one side of a flow field plate functions as the anode flow field plate for one fuel cell while the opposite side of the flow field plate functions as the cathode flow field plate in another fuel cell. This arrangement may be referred to as a bipolar plate. The stack typically also includes monopolar plates such as, for example, an anode coolant flow field plate having one side that serves as an anode flow field plate and another side that serves as a coolant flow field plate. As an example, the open-faced coolant channels of an anode coolant flow field plate and a cathode coolant flow field plate may be mated to form collective coolant channels to cool the adjacent flow field plates forming fuel cells.

Typically, in a fuel cell stack, the inlets (e.g., anode gas inlet, cathode gas inlet and coolant inlet) of the flow field plates are aligned to form inlet manifolds (e.g., anode gas inlet manifold, cathode gas inlet manifold and coolant inlet manifold, respectively). The fluids (e.g., anode gas, cathode gas and coolant, respectively) flow along their respective inlet manifolds (e.g., anode gas inlet manifold, cathode gas inlet manifold, coolant inlet manifold, respectively) and enter their respective flow field plates (e.g., anode gas flow field plate, cathode gas flow field plate and coolant flow field plate, respectively) via their respective inlet regions (e.g., anode gas inlet region, cathode gas inlet region and coolant inlet region, respectively). Generally, a fuel cell stack has similarly aligned outlets of the flow field plates to form respective outlet manifolds that are in fluid communication with their respective outlet regions and that operate in a similar fashion to the inlet manifolds.

SUMMARY

The invention relates to sealant designs for fuel cells, as well as fuel cell systems and methods using such sealant designs.

In general, the invention involves disposing one or more electrically insulating materials (e.g., electrically insulating sealant materials) within the coolant manifold of a fuel cell or fuel cell system (e.g., along at least a portion of the surface of the coolant manifold) so that coolant flowing through the coolant manifold has a relatively long conductance path. The conductance path of a coolant is the minimum distance a coolant flows along the coolant manifold from a flow field plate (e.g., a coolant flow field plate, an anode flow field plate, or a cathode flow field plate) at one electrical potential to a different flow field plate (e.g., a coolant flow field plate, an anode flow field plate or a cathode flow field plate) at a different electrical potential without contacting any intervening flow field plates.

Having a relatively long conductance path for the coolant can reduce the rate and/or amount of electrolysis the coolant undergoes relative to an otherwise substantially identical fuel cell system having a design in which the conductance path of the coolant is relatively short. Decreasing the rate and/or amount of coolant electrolysis can decrease the rate and/or amount of coolant decomposition. This can decrease the amount and/or rate of undesirable gas formation due to coolant decomposition, decrease the amount and/or rate of change in the ionic character of the coolant, decrease the amount and/or rate of change of corrosive components in the coolant, decrease the amount and/or rate of change in the freeze point of the coolant, and/or increase the useful life of the coolant.

Decreasing the amount of corrosive components in the coolant can decrease the amount and/or rate of corrosion of materials exposed to the coolant, including flow field plate material (e.g., coolant flow field plate material, anode flow field plate material and/or cathode flow field plate material) and/or portions of the coolant loop external to the fuel cell stack.

In some embodiments, a relatively small amount of flow field plate material (e.g., the amount of coolant flow field plate material, the amount of anode flow field plate material, and/or the amount of cathode flow field plate material) is exposed to the coolant as coolant flows through the fuel cell system. Having a relatively small amount of coolant exposed to plate material as the coolant flows through the fuel cell system can reduce the amount and/or rate of corrosion of plate material relative to an otherwise substantially identical fuel cell system having a design in which a relatively large amount of coolant is exposed to plate material as the coolant flows through the fuel cell system.

Decreasing the rate and/or amount of plate material corrosion can decrease the amount and/or rate of coolant decomposition, decrease the amount and/or rate of undesirable gas formation due to coolant decomposition, decrease the amount and/or rate of change of corrosive components in the coolant, decrease the amount and/or rate of change in the ionic character of the coolant, decrease the amount and/or rate of change in the freeze point of the coolant, and/or increase the useful life of the coolant.

Moreover, in embodiments in which the fuel cell system is designed to have decreased plate material corrosion, the amount of corrosion inhibitor added to the coolant can be decreased (e.g., decreased to zero amount of added corrosion inhibitor) relative to an otherwise substantially identical fuel cell system having a design with higher plate material corrosion. This can be advantageous because the addition of certain corrosion inhibitors to a coolant can increase the ionic character of the resulting coolant solution, thereby increasing the possibility of coolant electrolysis and associated detrimental side effects.

In one aspect, the invention features a fuel cell system with a coolant manifold, two coolant flow field plates and an electrically insulating material (e.g., an electrically insulating sealant material) between the two coolant flow field plates. One coolant flow field plate has an orifice that defines a first portion of the fluid manifold, and the other coolant flow field plate has an orifice that defines a second portion of the fluid manifold. The electrically insulating material extends into the coolant manifold. In certain embodiments, one coolant flow field plate can be the first side of monopolar flow field plate with the opposite side of the monopolar flow field plate being a reactant flow field plate (e.g., an anode flow field plate or a cathode flow field plate). In certain embodiments, the other coolant flow field plate can be one side of a different monopolar flow field plate with the opposite side of the monopolar flow field plate being a different reactant flow field.

In another aspect, the invention features a fuel cell system that has a coolant manifold, two monopolar flow field plates and an electrically insulating material (e.g., an electrically insulating sealant material) between the monopolar flow field plates. One monopolar flow field plate has an orifice that defines a portion of the coolant manifold, one side that forms a coolant flow field plate and another side that forms a cathode flow field plate. The other monopolar flow field plate has an orifice that defines a portion of the coolant manifold, one side that forms a coolant flow field plate and another side that forms an anode flow field plate. The coolant flow field plates contact each other, and the electrically insulating material extends into the coolant manifold.

In a further aspect, the invention features a fuel cell system that has a coolant manifold, three monopolar flow field plates, and an electrically insulating material (e.g., an electrically insulating sealant material). The electrically insulating material extends into the coolant manifold. The first monopolar flow field plate has an orifice defining a portion of the coolant manifold, a first side forming a first coolant flow field plate and a second side forming a cathode flow field plate. The second monopolar flow field plate has an orifice defining a portion of the coolant manifold, a first side forming a second coolant flow field plate and a second side forming an anode flow field plate. The third monopolar flow field plate has an orifice defining a portion of the coolant manifold, a first side forming a third coolant flow field plate, the first flow field plate being between the second and third flow field plates. The electrically insulating material is between the coolant plates of the first and second monopolar flow field plates, and the electrically insulating material extends into the coolant manifold.

In one aspect, the invention features a fuel cell system having a coolant manifold, two coolant flow field plates, a fuel cell between the two coolant flow field plates, and an electrically insulating material (e.g., an electrically insulating sealant material) disposed in the coolant manifold. The first coolant flow field plate has an orifice defining a first portion of the coolant manifold. The orifice of the first coolant flow field plate has an edge with a length along the coolant manifold. The second coolant flow field plate has an orifice defining a second portion of the coolant manifold. The orifice of the second coolant flow field plate has an edge with a length along the coolant manifold. The fuel cell includes an anode flow field plate having an orifice defining a third portion of the coolant manifold. The orifice of the anode flow field plate has an edge extending a length along the coolant manifold. The fuel cell also includes a cathode flow field plate having an orifice defining a fourth portion of the coolant manifold. The orifice of the cathode flow field plate has an edge extending a length along the coolant manifold. The fuel cell further includes a proton exchange membrane between the anode and cathode flow field plates. The electrically insulating material extends along at least a portion (e.g., the entirety of) a length of the coolant manifold defined by the lengths of the edges of the orifices of the first coolant flow field plate, the second coolant flow field plate, the anode flow field plate and the cathode flow field.

In another aspect, the invention features a fuel cell that has a coolant manifold, two monopolar plates, and a membrane electrode assembly. The first monopolar plate has a first side defining a first coolant flow field plate and a second side defining an anode flow field plate. The second monopolar plate has a first side defining a second coolant flow field plate and a second side defining a cathode flow field plate. The membrane electrode assembly is between the anode and cathode flow field plates. The anode and cathode flow field plates face each other. The membrane electrode assembly contacts the anode flow field plate, and the membrane electrode assembly contacts the cathode flow field plate contacts so that a fluid can flow along the coolant manifold from the first coolant flow field plate to the second coolant flow field plate without contacting the anode flow field plate, the cathode flow field plate or the membrane electrode assembly.

In a further aspect, the invention features a fuel cell having a coolant manifold, two monopolar flow field plates, a membrane electrode assembly and electrically insulating means. The first monopolar plate has a first side defining a first coolant flow field plate and a second side defining an anode flow field plate. The second monopolar plate has a first side defining a second coolant flow field plate and a second side defining a cathode flow field plate, the anode and cathode flow field plates facing each other. The membrane electrode assembly is between the anode and cathode flow field plates. The membrane contacts a surface of the anode flow field plate, and the membrane electrode assembly contacts a surface of the cathode flow field plate. The electrically insulating means is for electrically insulating a flow path along the coolant manifold from the first coolant flow field plate to the second coolant flow field plate.

In another aspect, the invention features a method of operating a fuel cell system. The fuel cell system has a coolant manifold, two monopolar flow field plates, and a membrane electrode assembly between the first and second monopolar flow field plates. One monopolar flow field plate has a first side defining a first coolant flow field plate and a second side defining an anode flow field plate. The other monopolar plate has a first side defining a second coolant flow field plate and a second side defining a cathode flow field plate. The anode and cathode flow field plates face each other so that the membrane contacts a surface of the anode flow field plate. The membrane contacts a surface of the cathode flow field plate. The method includes flowing a fluid along the coolant manifold from the first coolant flow field plate to the second coolant flow field plate without contacting the anode flow field plate, the cathode flow field plate or the membrane electrode assembly.

In a further aspect, the invention features a fuel cell system having a coolant manifold. The fuel cell system further includes two coolant flow field plates and a fuel cell between the coolant flow field plates. The coolant flow field plates are at different electrical potentials. The fuel cell includes an anode flow field plate, a cathode flow field plate and a membrane electrode assembly between the anode and cathode flow field plates. The fuel cell system has a coolant conductance path greater than a thickness of the membrane electrode assembly. In some embodiments, the coolant conduct path is greater than the combined thickness of the membrane electrode assembly and the cathode flow field plate. In certain embodiments, the coolant conductance path is greater than the combined thickness of the membrane electrode assembly and the anode flow field plate. In embodiments, the coolant conduct path can be greater than the combined thickness of the membrane electrode assembly, the cathode flow field plate and the anode flow field plate.

Embodiments can include one or more of the following features.

The electrically insulating material (e.g., electrically insulating sealant material) can extend into a region between the orifice of one coolant flow field plate and the orifice of the other coolant flow field plate.

The two coolant flow field plates can contact each other. The electrically insulating material (e.g., electrically insulating sealant material) can contact the two coolant flow field plates.

The fuel cell system can include an additional electrically insulating material, such as an electrically insulating sealant material (e.g., that extends into the coolant manifold). The electrically insulating materials (e.g., electrically insulating sealant materials) can contact each other.

The additional electrically insulating material can be between the other electrically insulating material and one of the coolant flow field plates. The additional electrically insulating material can contact the other electrically insulating material and the other coolant flow field plate. The first electrically insulating material can contact the first coolant flow field plate.

The orifice of one of the coolant flow field plates can have an edge with a length along the coolant manifold, and the electrically insulating material (e.g., electrically insulating sealant material) can extend adjacent the length of the edge of the orifice of the first coolant flow field plate along the coolant manifold.

The orifice of one coolant flow field plate can have an edge with a length along the coolant manifold, and the orifice of the other coolant flow field plate can have an edge with a length along the coolant manifold. One electrically insulating material (e.g., electrically insulating sealant material) can extend adjacent the length of the edge of the orifice of the second coolant flow field plate along the coolant manifold, and the other electrically insulating material (e.g., electrically insulating sealant material) can extend adjacent the length of the edge of the orifice of the first coolant flow field plate along the coolant manifold.

The fuel cell system can further include a third coolant flow field plate that has an orifice that defines a portion of the coolant manifold. The orifice of the third coolant flow field plate can have an edge with a length along the coolant manifold, and the orifice of the first coolant flow field plate can have an edge with a length along the coolant manifold. One electrically insulating material (e.g., electrically insulating sealant material) can extend adjacent the length of the edge of the orifice of the third coolant flow field plate along the coolant manifold, and the other electrically insulating material (e.g., electrically insulating sealant material) can extend adjacent the length of the edge of the orifice of the first coolant flow field plate along the coolant manifold.

In embodiments in which the electrically insulating material is formed of one or more electrically insulating sealant material(s), the sealant material(s) can be formed of gaskets. The sealant material(s) can be formed of one or more polymer (e.g., one or more silicone polymers).

Other features, aspects and advantages of the invention will be apparent from the description, drawings and the claims.

DETAILED DESCRIPTION

Figure 1A:
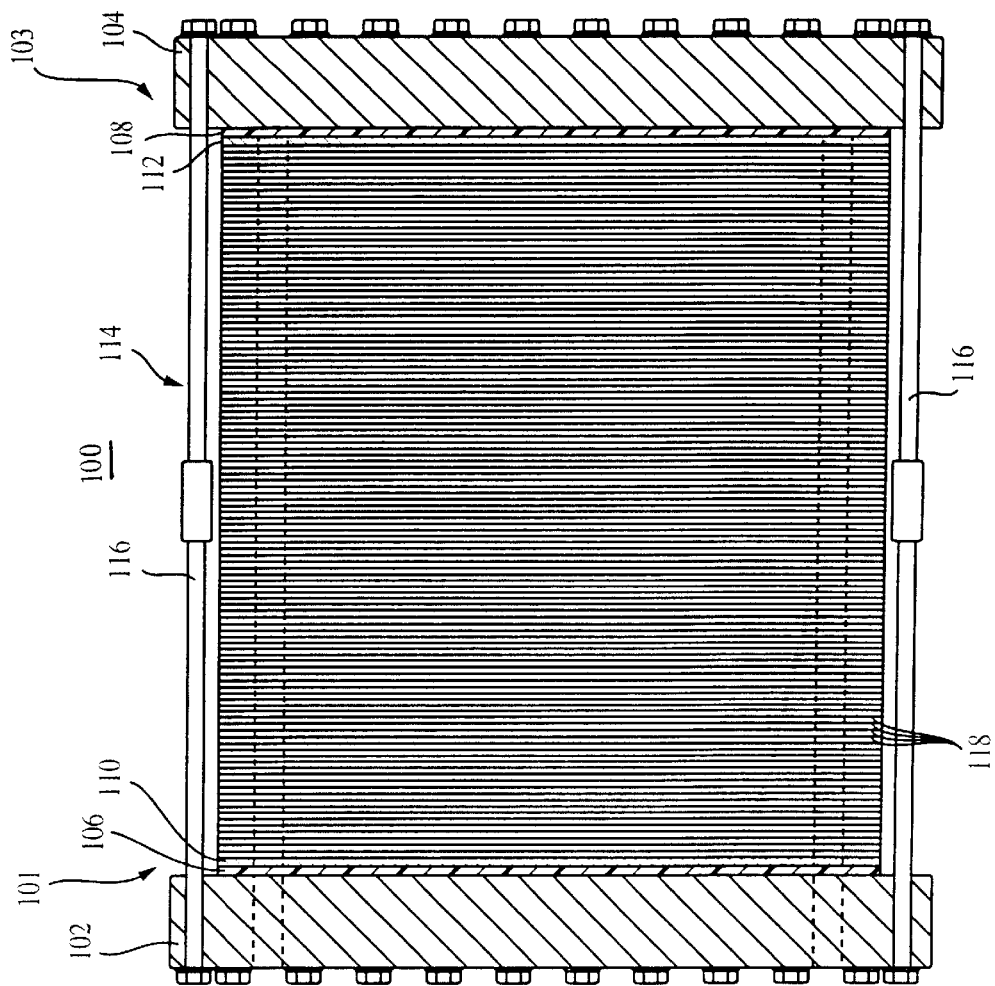
FIG. 1A is a side view of an embodiment of a fuel cell assembly.

FIG. 1A shows a fuel cell system 100 including a fuel cell stack 114 located between an end assembly 101 and an end assembly 103. End assembly 101 includes an end plate 102, an insulation layer 106, and a current collector/conductor plate 110 in that order. Similarly, end assembly 103 includes an end plate 104, an insulation layer 108, and a current collector/conductor plate 112. Four tie-bolts 116, join the end plates and compress the fuel cell assembly, typically with sufficient pressure to create both fluid tight seals and good electrical contact between PEM fuel cells 118 of cell stack 114.

Figure 1B:
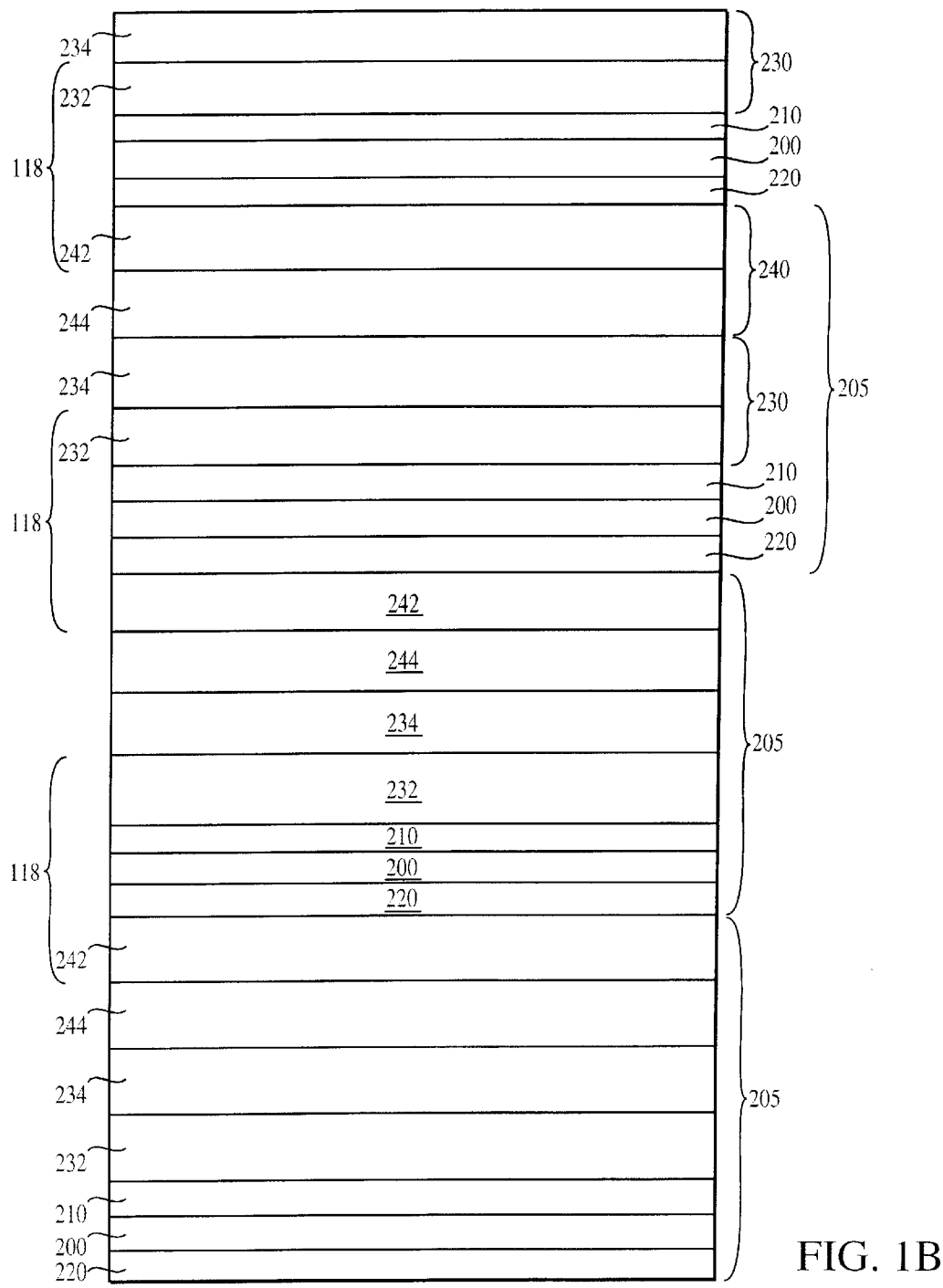
FIG. 1B is a partial cross-sectional view of the fuel cell assembly of FIG. 1A.

FIG. 1B shows a cross-sectional view of a portion of stack 114 when assembled. Each fuel cell 118 is formed of a cathode flow field plate 232, an anode flow field plate 242, an MEA 200, a cathode GDL 210 and an anode GDL 220. Each cathode flow field plate 232 is one side of a monopolar flow field plate 230 having a coolant flow field plate 234 on its opposite side. Each anode flow field plate 242 is one side of a monopolar flow field plate 240 having a coolant flow field plate 244 on its opposite side. Coolant flow field plates 234 and 244 are in contact when stack 114 is assembled. Typically, the surface of each anode flow field plate 242 is at least partially coated with an electrically insulating material (e.g., nitrile) so that neighboring units 205 (each formed of a monopolar flow field plate 230, an adjacent monopolar flow field plate 240, an MEA 200, a cathode GDL 210, an anode GDL 220) are electrically insulated from each other. During operation of stack 114, each unit 205 is typically at a different electrical potential than the other units 205 in stack 114.

Figure 2:
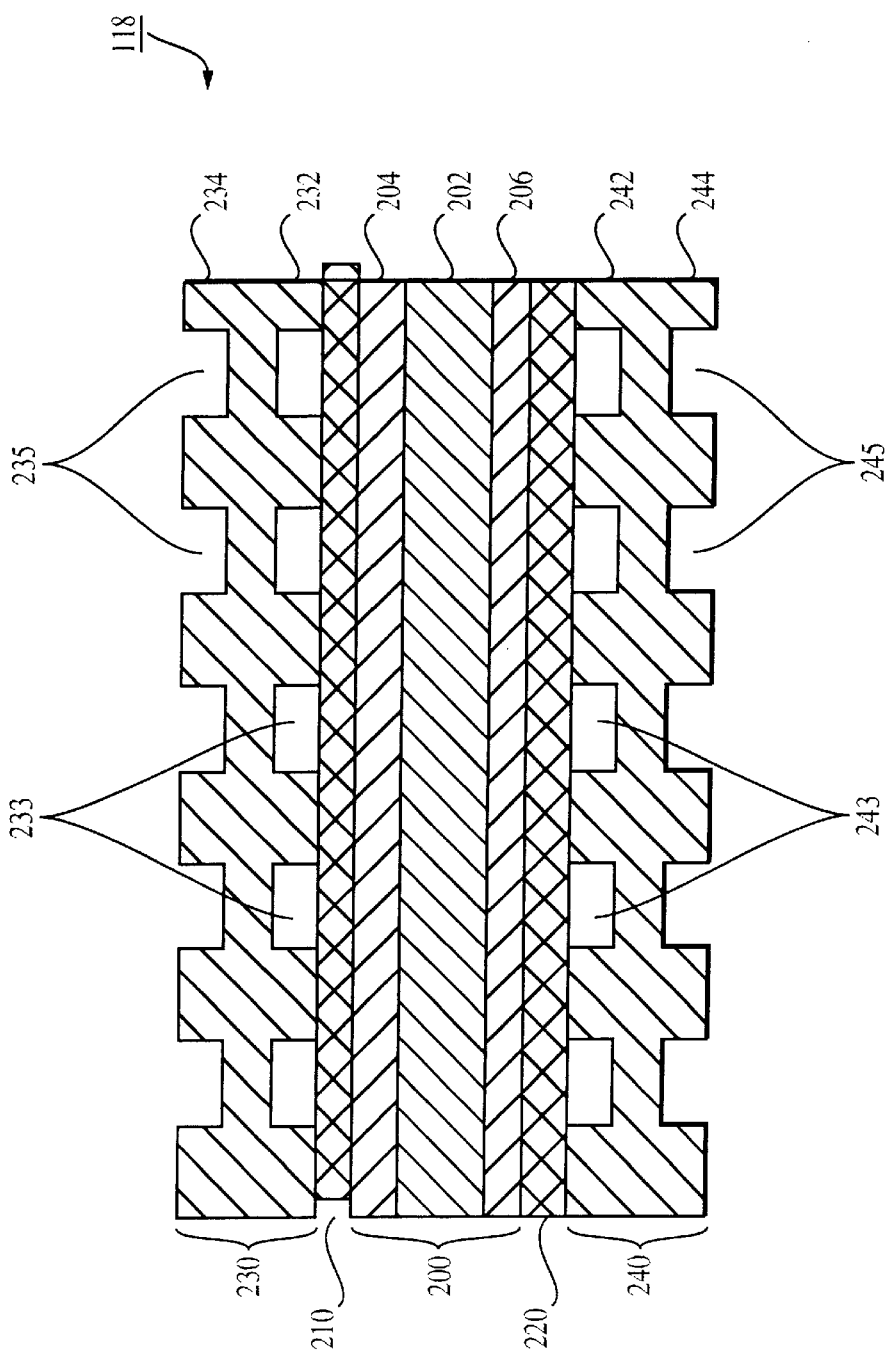
FIG. 2 is a partial cross-sectional view of an embodiment of a fuel cell.

FIG. 2 is a cross-sectional view of a portion of stack 114 including monopolar flow field plates 230 and 240, MEA 200, cathode GDL 210 and anode GDL 220. Plate 230 has a cathode flow field plate 232 with open-faced flow channels 233 on one side (facing GDL 210) and a coolant flow field plate 234 with open-faced flow channels 235 on the opposite side. Plate 240 has an anode flow field plate 242 with open-faced flow channels 243 on one side (facing GDL 220) and a coolant flow field plate 244 with open-faced flow channels 245 on the opposite side. MEA 200 includes a PEM 202, a cathode catalyst 204 and an anode catalyst 206.

FIGS. 3–6C are plan views of flow field plates 232, 242, 244 and 234 respectively.

Figure 3:
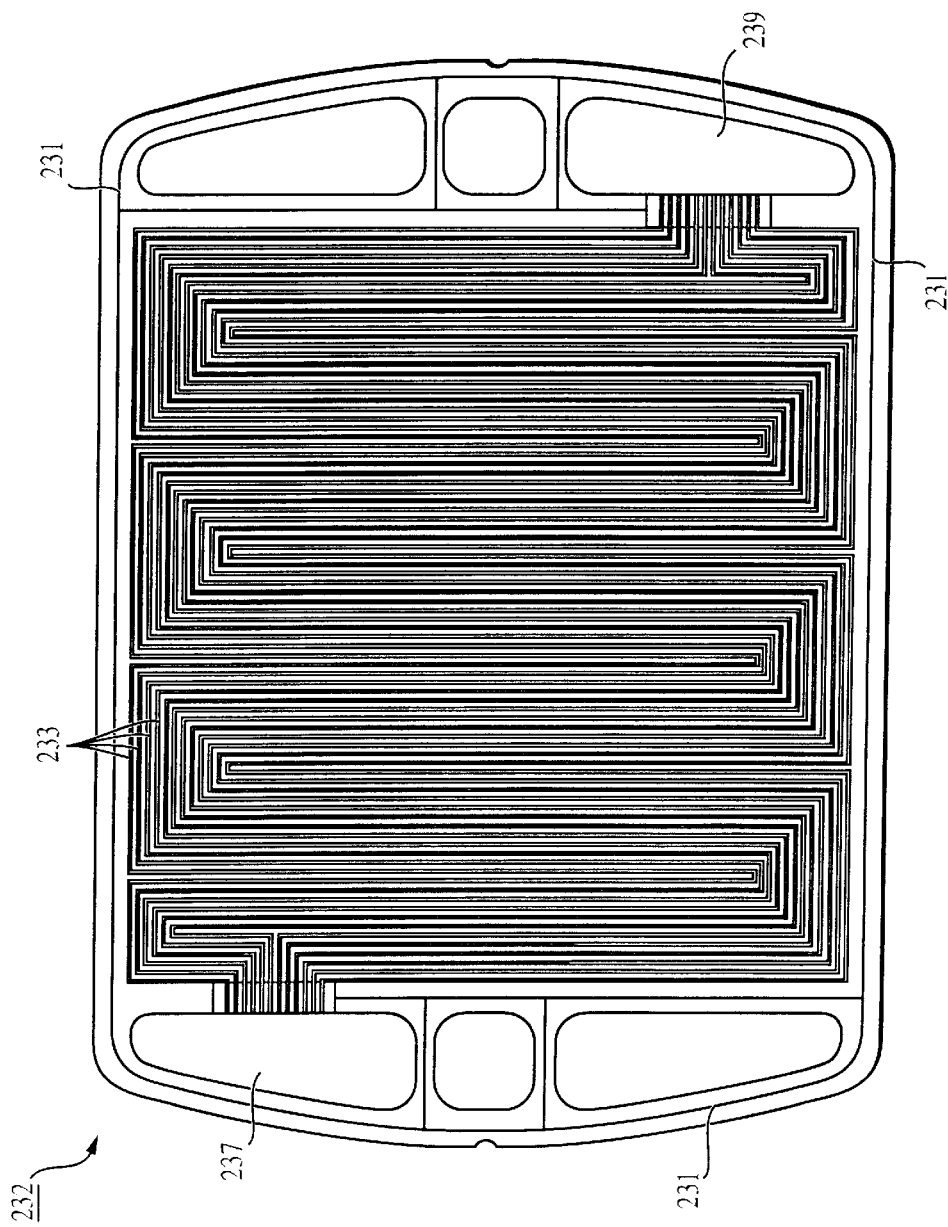
FIG. 3 is a plan view of an embodiment of a cathode flow field plate.
Figure 4:
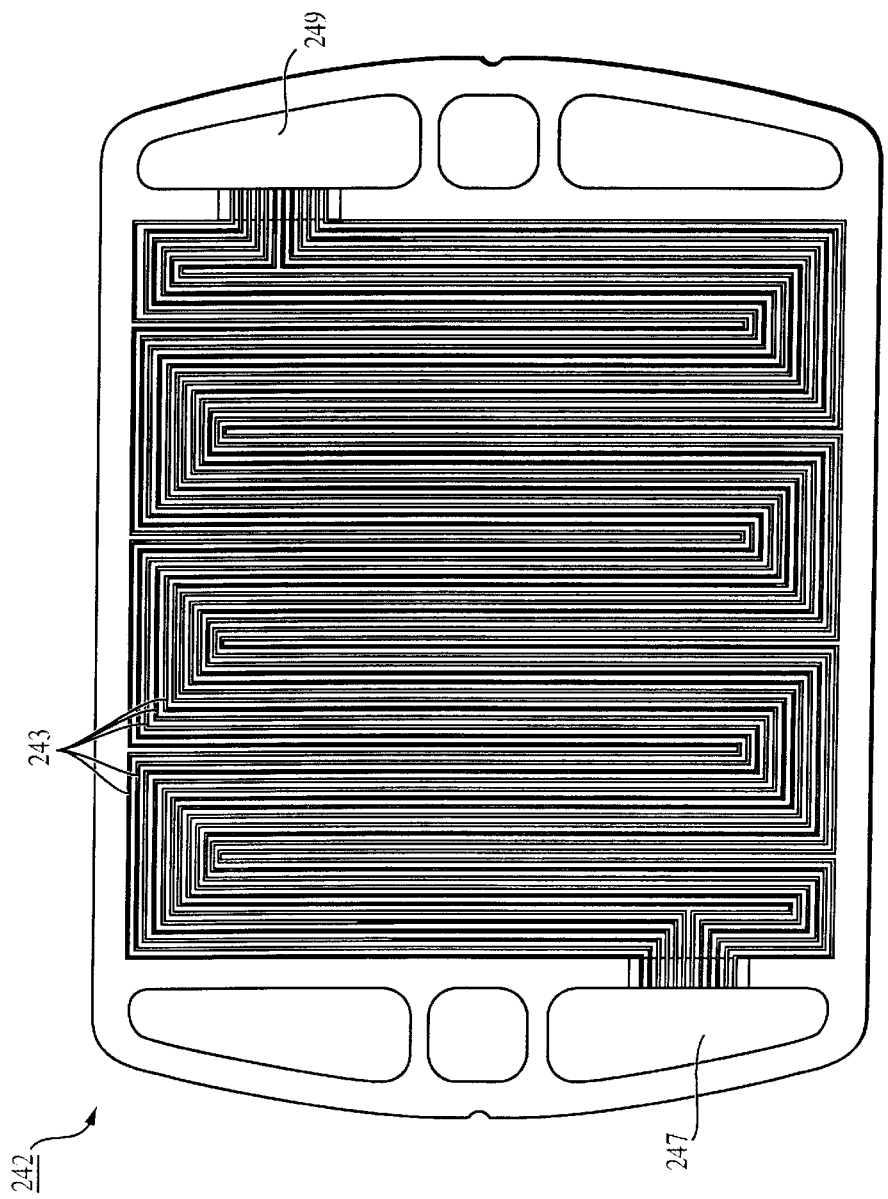
FIG. 4 is a plan view of an embodiment of an anode flow field plate.

Plate 232 has flow channels 233, a cathode gas inlet manifold 237 and a cathode gas outlet manifold 239 (FIG. 3). Plate 232 also includes a groove 231 in which a sealant material (e.g., a gasket) 229 is disposed (FIG. 3). Plate 242 has flow channels 243, an anode gas inlet manifold 247 and an anode gas outlet manifold 249 (FIG. 4).

Figure 5:
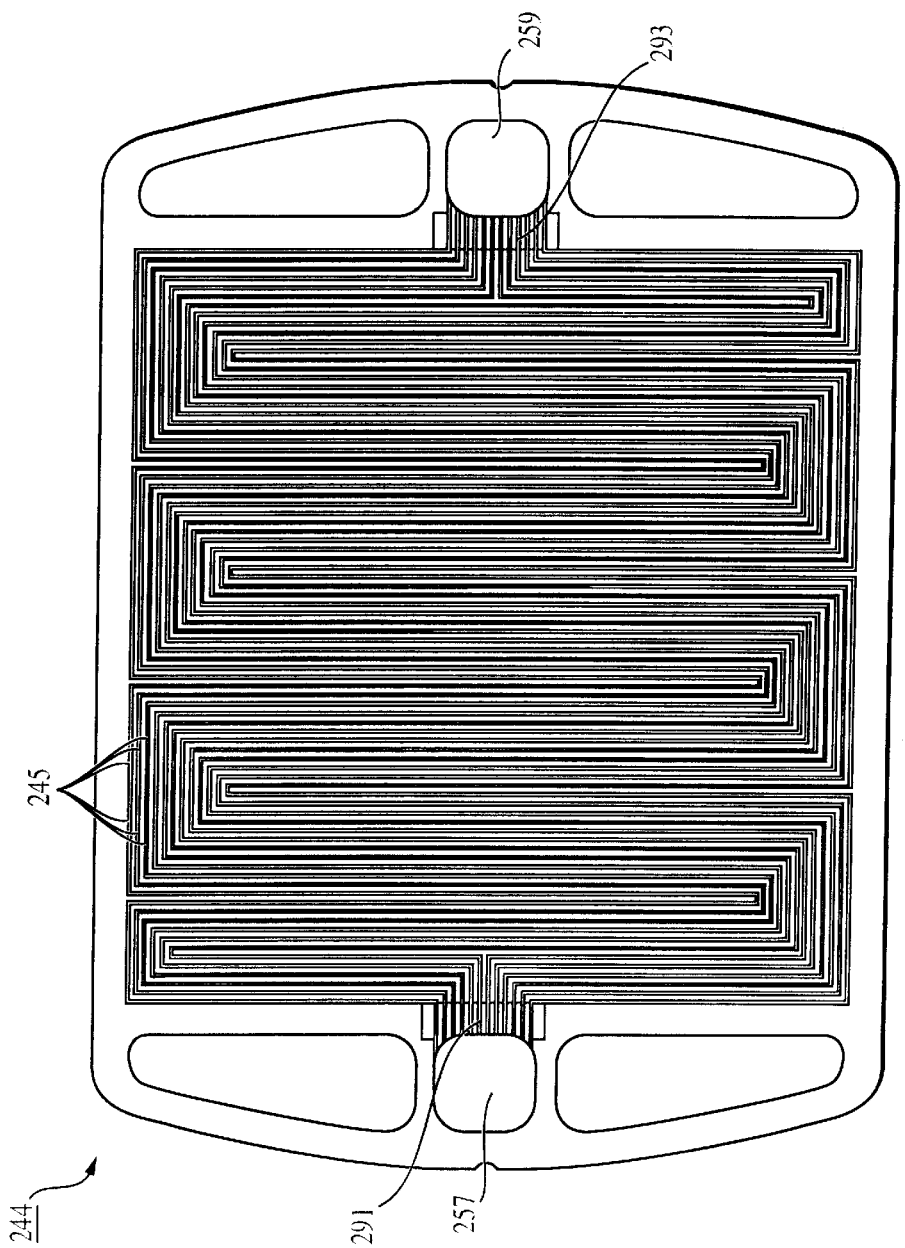
FIG. 5 is a plan view of an embodiment of a coolant flow field plate.
Figure 6A:
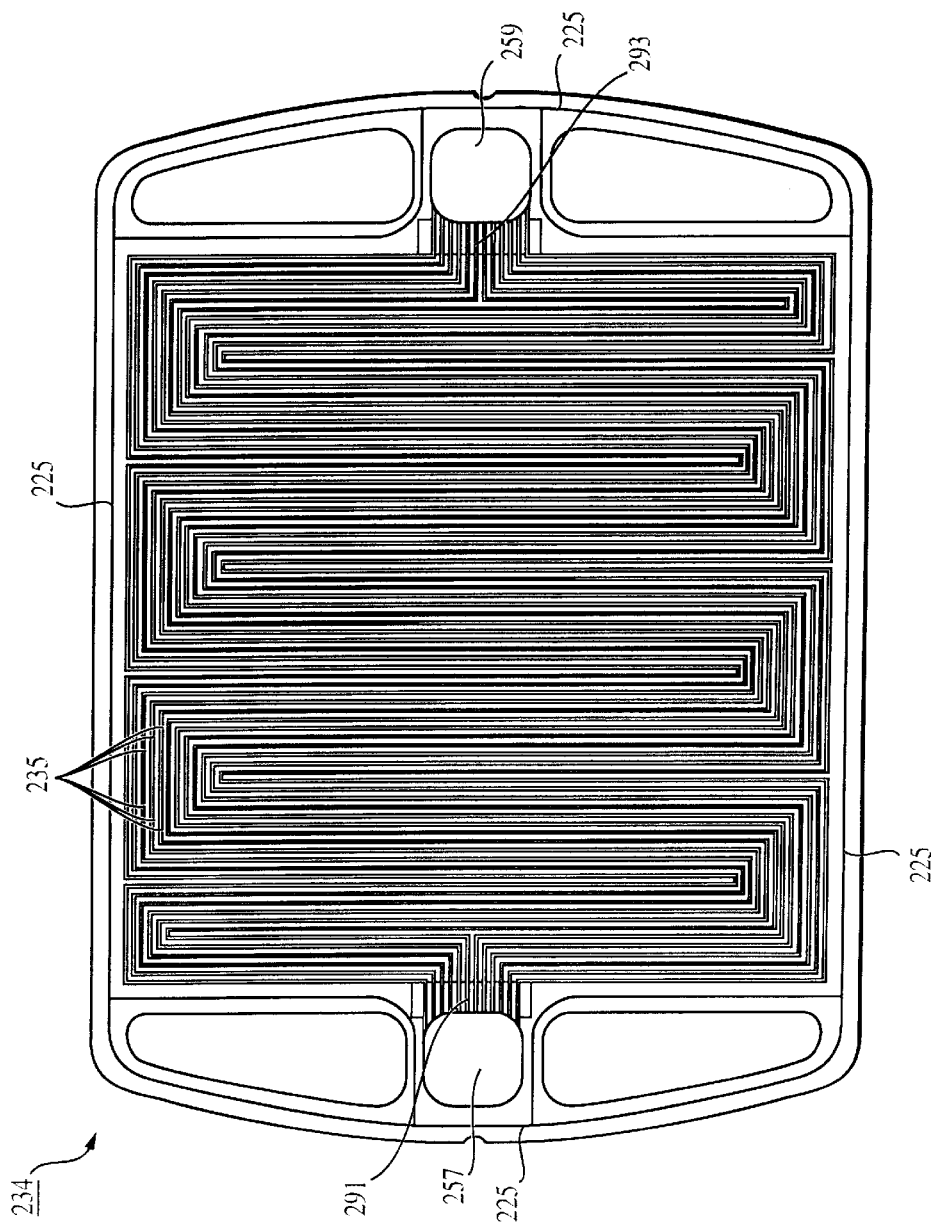
FIG. 6A is a plan view of an embodiment of a coolant flow field plate.
Figure 6B:
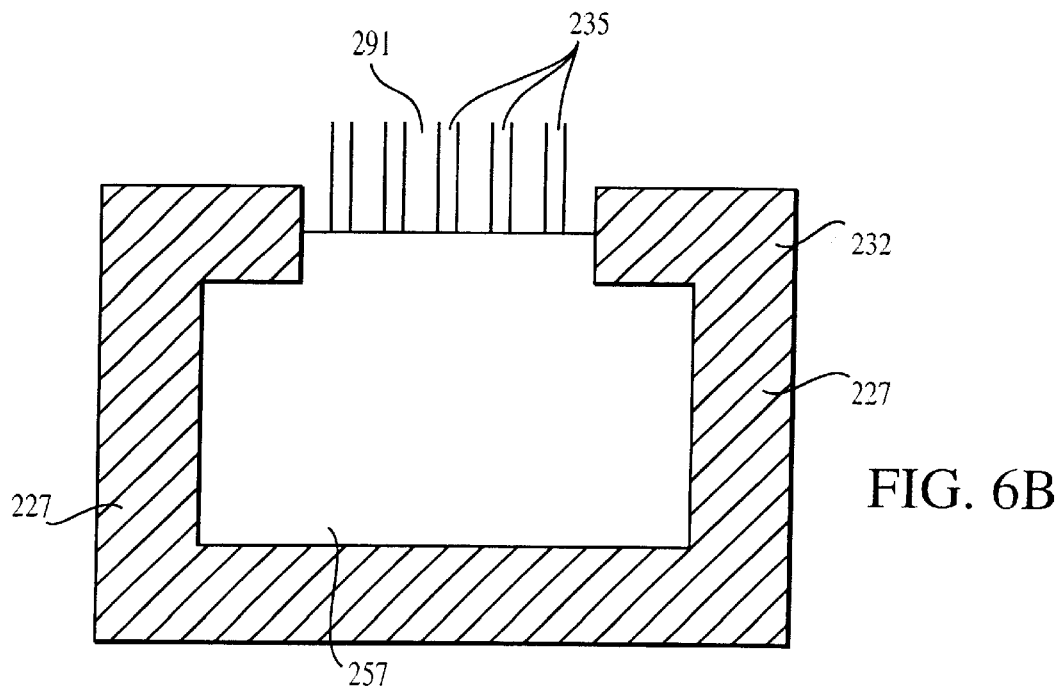
FIG. 6B is a plan view of a portion of the coolant flow field plate of FIG. 6A.
Figure 6C:
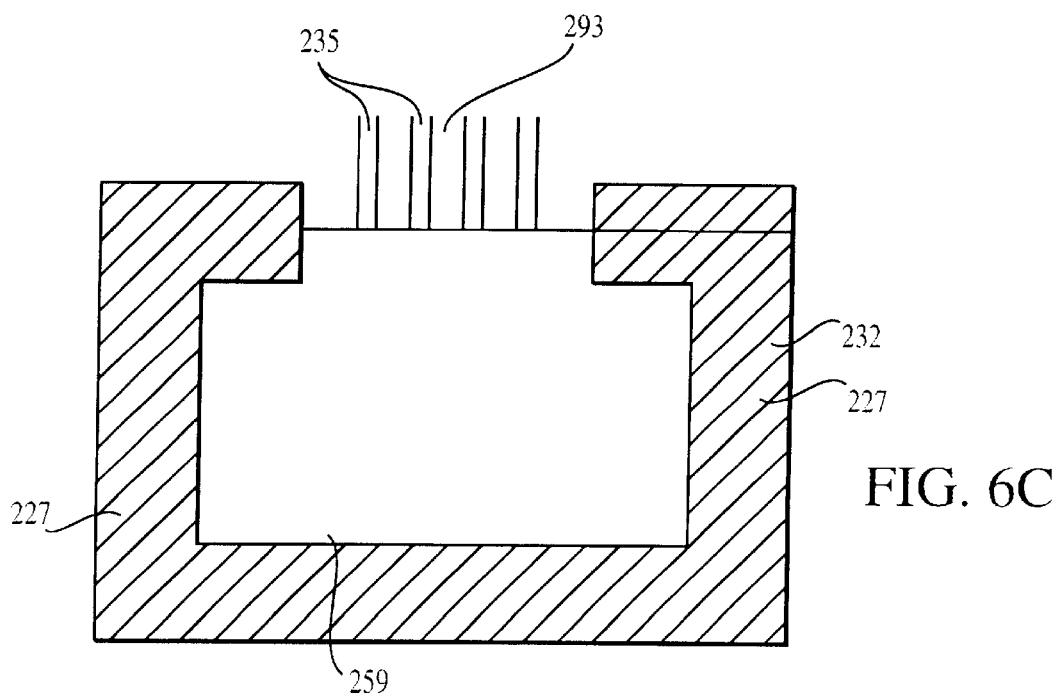
FIG. 6C is a plan view of a portion of the coolant flow field plate of FIG. 6A.

Coolant flow field plate 244 has channels 245, a coolant inlet 257 manifold, a coolant outlet manifold 259, a coolant inlet region 291, and a coolant outlet region 293 (FIG. 5). Coolant flow field plate 234 has channels 235, coolant inlet 257 manifold, coolant outlet manifold 259, coolant inlet region 291 and coolant outlet region 293 (FIG. 6A). Plate 234 also includes a groove 225. A sealant material 227 is disposed in groove 225 and extends at least partially into manifolds 257 and 259 but without covering respective inlet and outlet regions 291 and 293 (FIGS. 6B and 6C).

Sealant materials 227 and/or 229 are generally formed of materials that are substantially compatible with the chemical and/or physical environment of a PEM fuel cell system. Typically, sealant materials 227 and/or 299 are electrically insulating materials with an electrical resistivity of at least about one Ohm-centimeter (e.g., at least about 10 Ohm-centimeters, at least about 100 Ohm-centimeters, at least about $1 \times 10^3$ Ohm-centimeters, at least about $1 \times 10^4$ Ohm-centimeters, at least about $1 \times 10^5$ Ohm-centimeters, at least about 1×10⁶ Ohm-centimeters, at least about 1×10⁷ Ohm-centimeters, at least about 1×10⁸ Ohm-centimeters, at least about 1×10⁹ Ohm-centimeters, at least about 1×10¹⁰ Ohm-centimeters, at least about 1×10¹¹ Ohm-centimeters, at least about 1×10¹² Ohm-centimeters, at least about 1×10¹³ Ohm-centimeters, at least about 1×10¹⁴ Ohm-centimeters, at least about 1×10¹⁵ Ohm-centimeters, at least about 1×10¹⁶ Ohm-centimeters, at least about 1×10¹⁷ Ohm-centimeters, at least about 1×10¹⁸ Ohm-centimeters). In some embodiments, sealant materials 227 and/or 229 are in the form of gaskets. In certain embodiments, sealant materials 227 and/or 229 can have an o-ring cross-section.

An illustrative and nonlimiting list of materials that can be used as sealant materials 227 and/or 229 includes polymers, such as EPDM and silicone polymers (e.g., fluorinated silicone polymers and nonfluorinated silicone polymers).

Exemplary coolants include de-ionized water, ethylene glycol and/or organic coolants. Combinations of these coolants can be used. In some embodiments, the coolant is substantially free of corrosion inhibitors. In some embodiments, the coolant is selected in part based upon its freeze point. For example, in certain systems that are designed to be exposed to outdoor conditions, the coolant has a freeze point of at most about −20° C. (e.g., at most about −30° C., at most about −40° C.).

Figure 7:
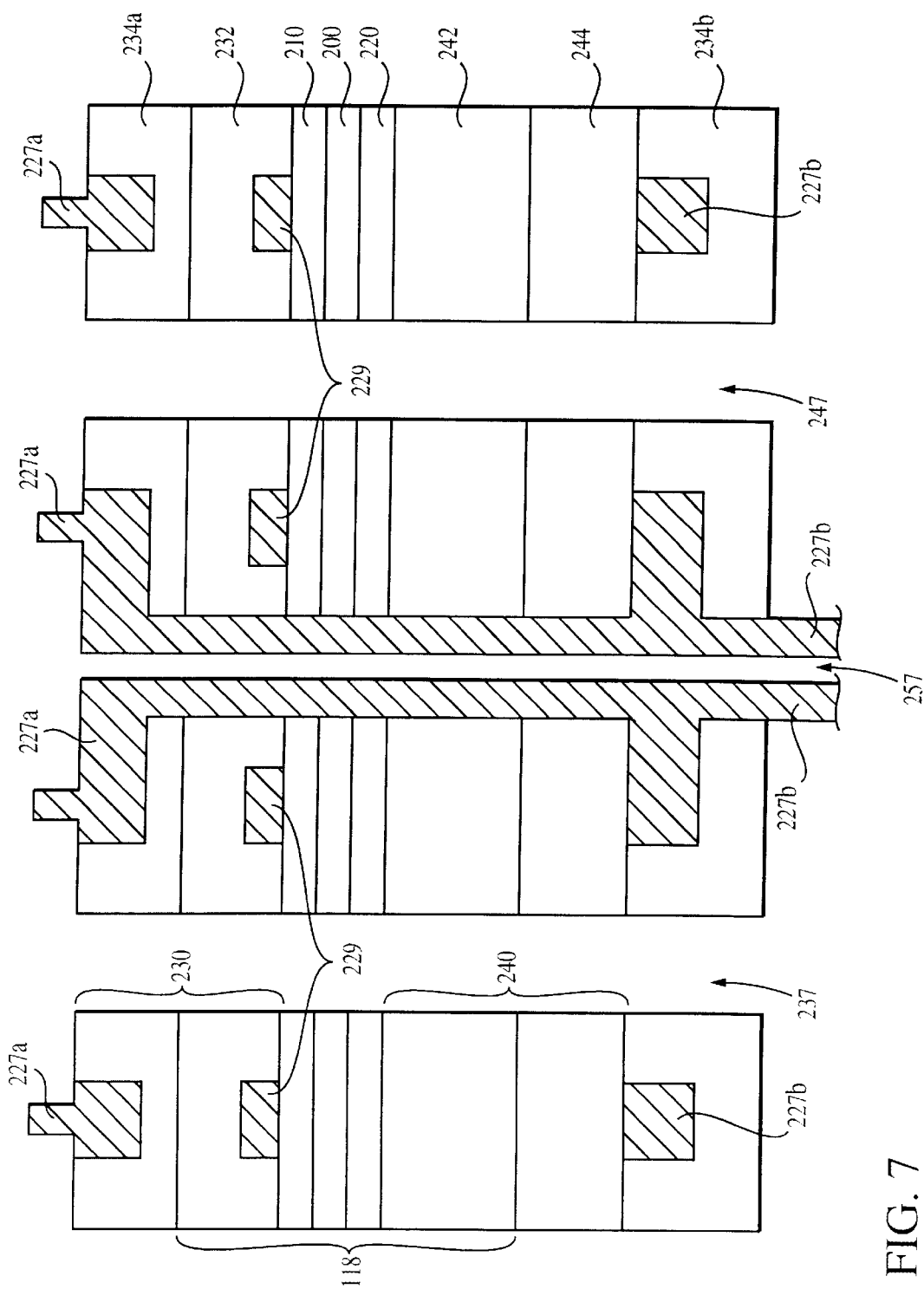
FIGS. 7 and 8 are partial cross-sectional views of an embodiment of a fuel cell stack.
Figure 8:
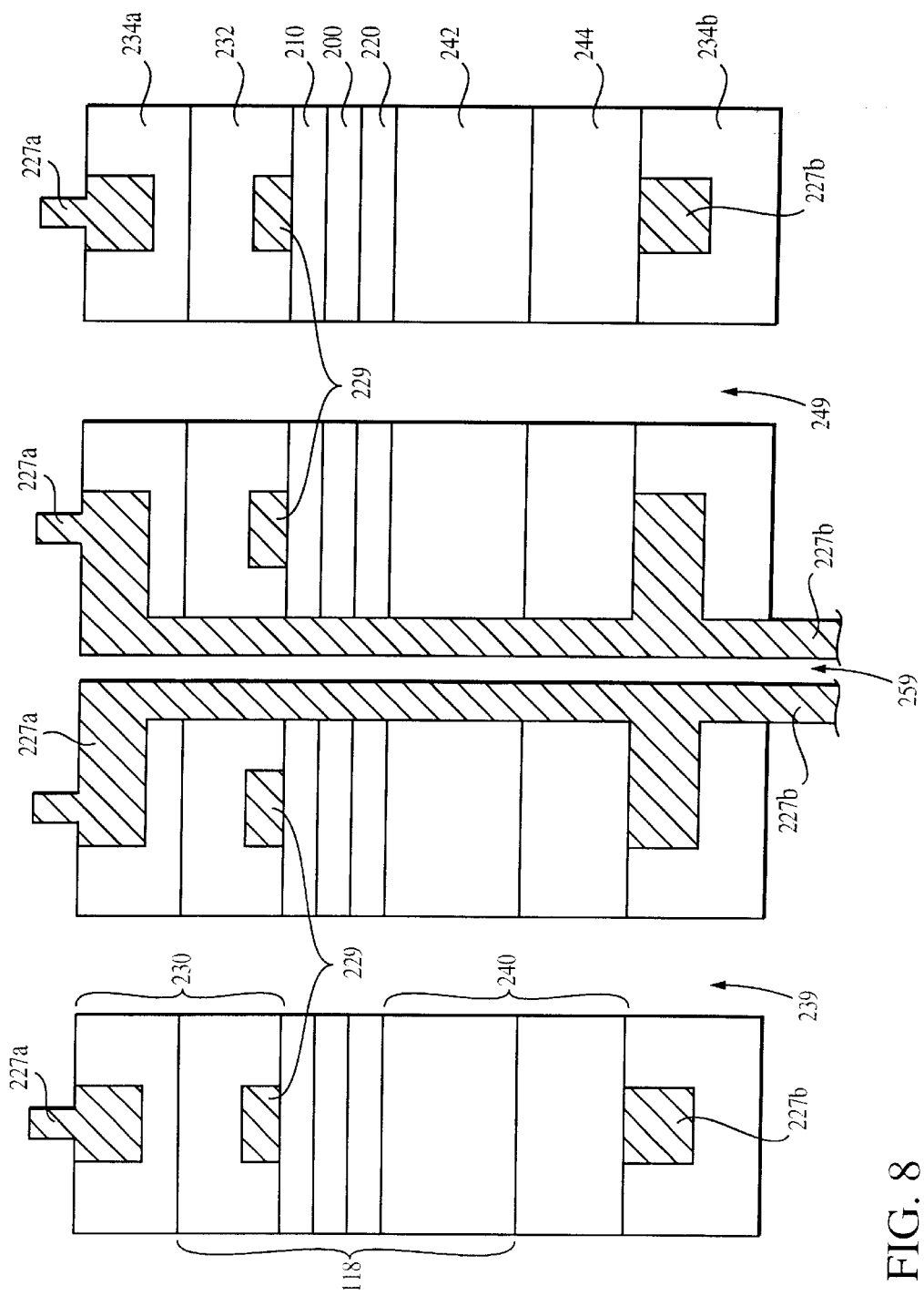

FIG. 7 is a partial cross-sectional view of assembled stack 114. Coolant flow field plates 234a and 244 are in direct contact, and anode and cathode flow field plates 242 and 232 are separated by MEA 200 and GDLs 210 and 220. Sealant material 227a extends from coolant flow field plate 234a along the surface of coolant inlet manifold 257 and seals against sealant material 227b in adjacent flow field plate 234b (which is at a different electrical potential). FIG. 8 is a similar partial cross-sectional view of the fuel cell in FIG. 7, but showing coolant outlet manifold 259.

With this arrangement, as coolant flows along coolant manifolds 257 and 259, the coolant only contacts flow field plate material at coolant flow field plate inlet and outlet regions 291 and 293, respectively. Moreover, when fuel cell stack 114 is assembled, adjacent coolant flow field plates 234a and 234b are at different electrical potentials. As a result, the conductance path of the coolant corresponds to the distance between the bottom of channels 235 in plate 234a and the bottom of channels 245 in plate 244. This corresponds to the thickness of plate 230 plus the thickness of plate 240 plus the thickness of MEA 200 plus the thickness of GDL 210 plus the thickness of GDL 220 minus the thickness of channels 235 minus the thickness of channels 245. In embodiments in which plate 230 is 140 mils thick, plate 240 is 140 mils thick, channels 235 are about 35 mils thick, channels 245 are about 35 mils thick and the combined thickness of MEA 200 and GDLs 210 and 220 is 12 mils, the conductance path of the coolant is about 222 mils.

Preferably, the conductance path of the coolant is greater than the combined thickness of the MEA and GDLs (e.g., greater than the combined thickness of the MEA, GDLs and the cathode flow field plate; greater than the combined thickness of the MEA, GDLs and the anode flow field plate; greater than the combined thickness of the MEA, GDLs and the cathode and anode flow field plates).

In some embodiments, the conductance flow path is at least about 15 mils (e.g., at least about 50 mils, at least about 75 mils, at least about 100 mils, at least about 125 mils, at least about 150 mils, at least about 175 mils, at least about 200 mils, at least about 220 mils).

Although shown as containing groove 225 with sealant material 227 in plate 234 and not in plate 244, it is to be understood that groove and sealant material 227 can be contained in plate 244 and not in plate 234. Other embodiments are also contemplated.

Figure 9:
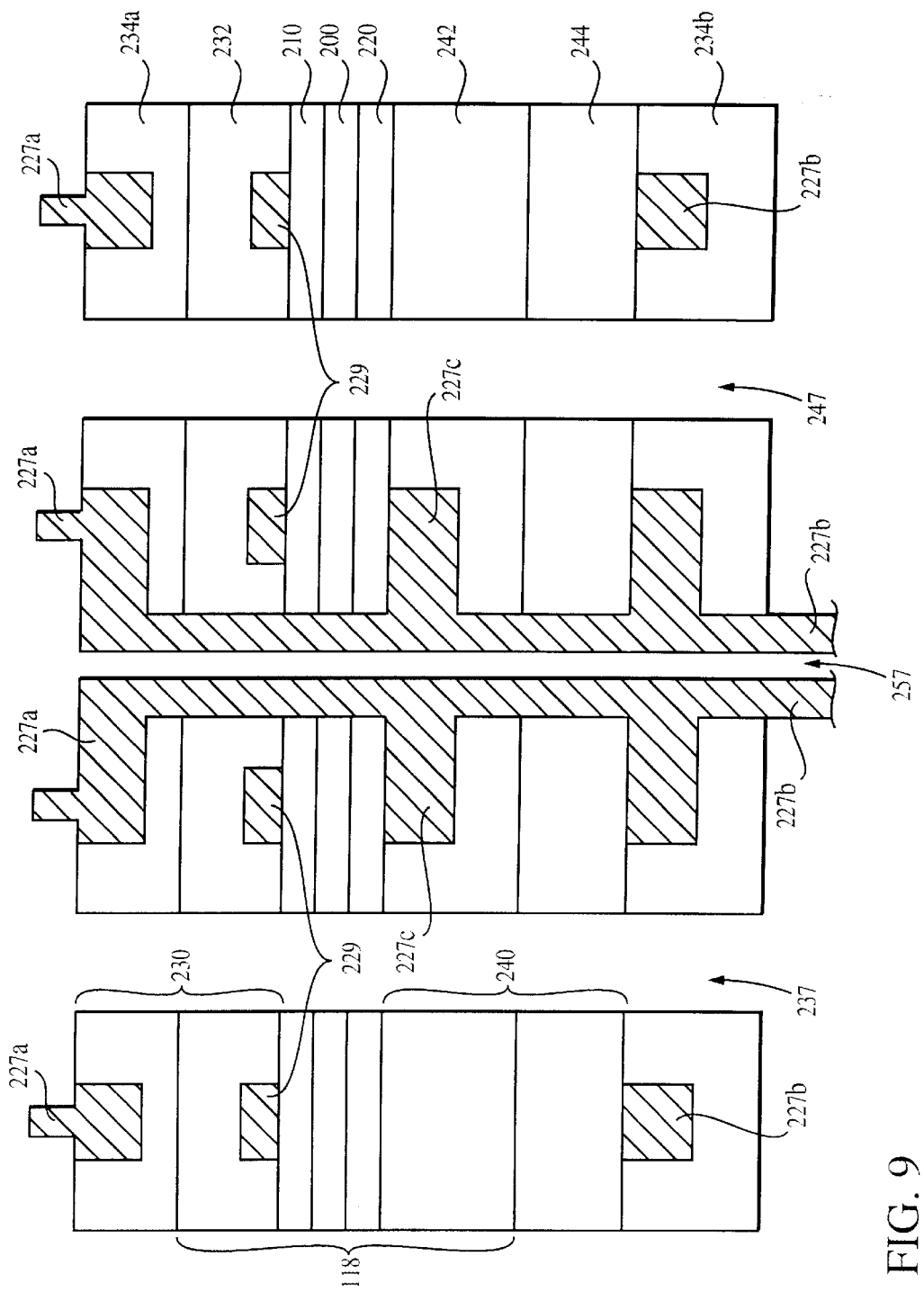
FIGS. 9 and 10 are partial cross-sectional views of an embodiment of a fuel cell stack.
Figure 10:
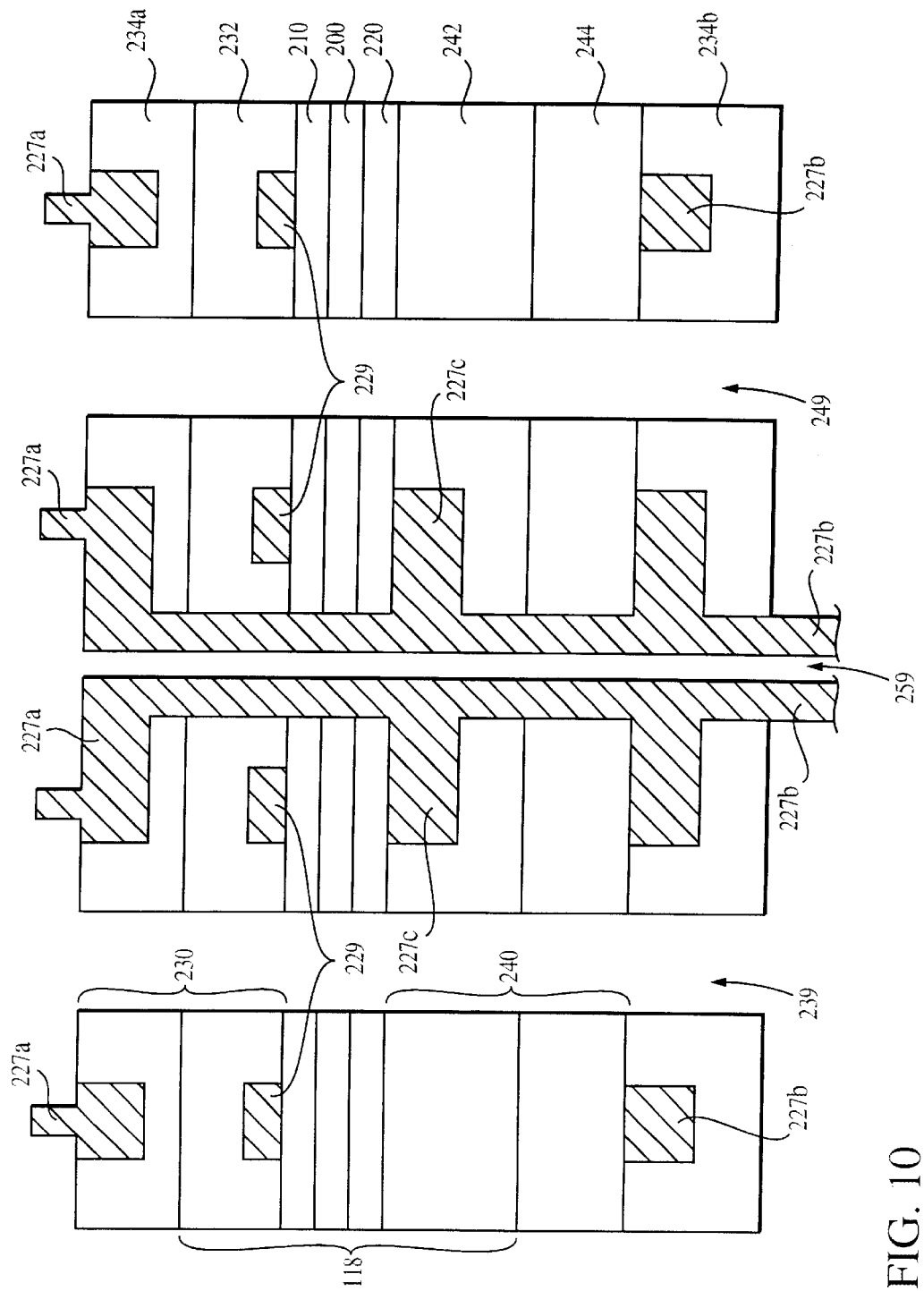

For example, FIGS. 9 and 10 are partial cross-sectional views of another embodiment in which both plates 234a, 234b and 242 have a groove with sealant material 227a, 227b and 227c, respectively.

Figure 11:
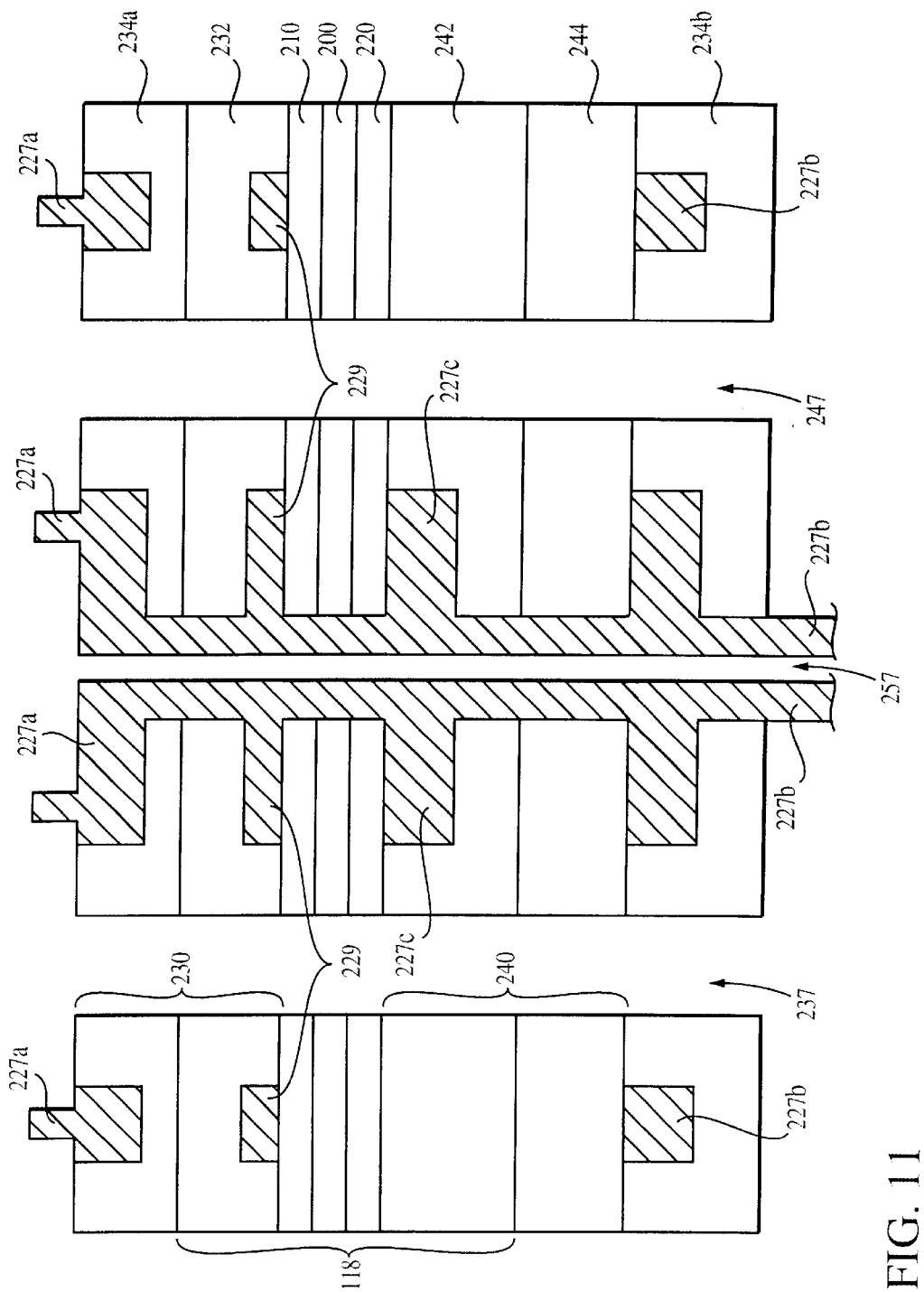
FIGS. 11 and 12 are partial cross-sectional views of an embodiment of a fuel cell stack.
Figure 12:
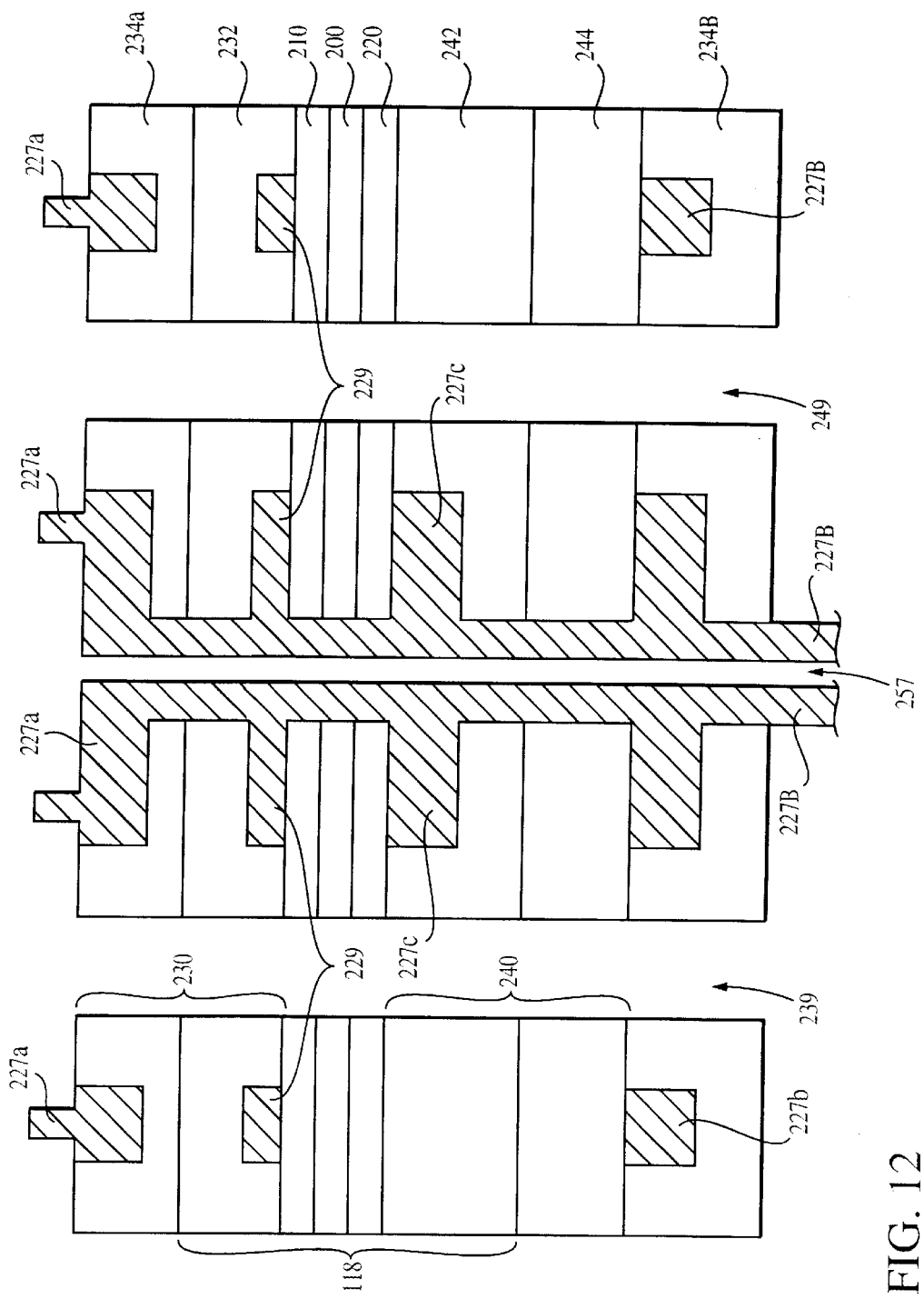

As another example, FIGS. 11 and 12 are partial cross-sectional views of an alternate embodiment in which plates 234a, 234b and 242 have a groove with sealant material 227a, 227b and 227c, respectively, and in which sealant material 229 in cathode flow field plate 232 extends along manifolds 257 and 259.

Figure 13:
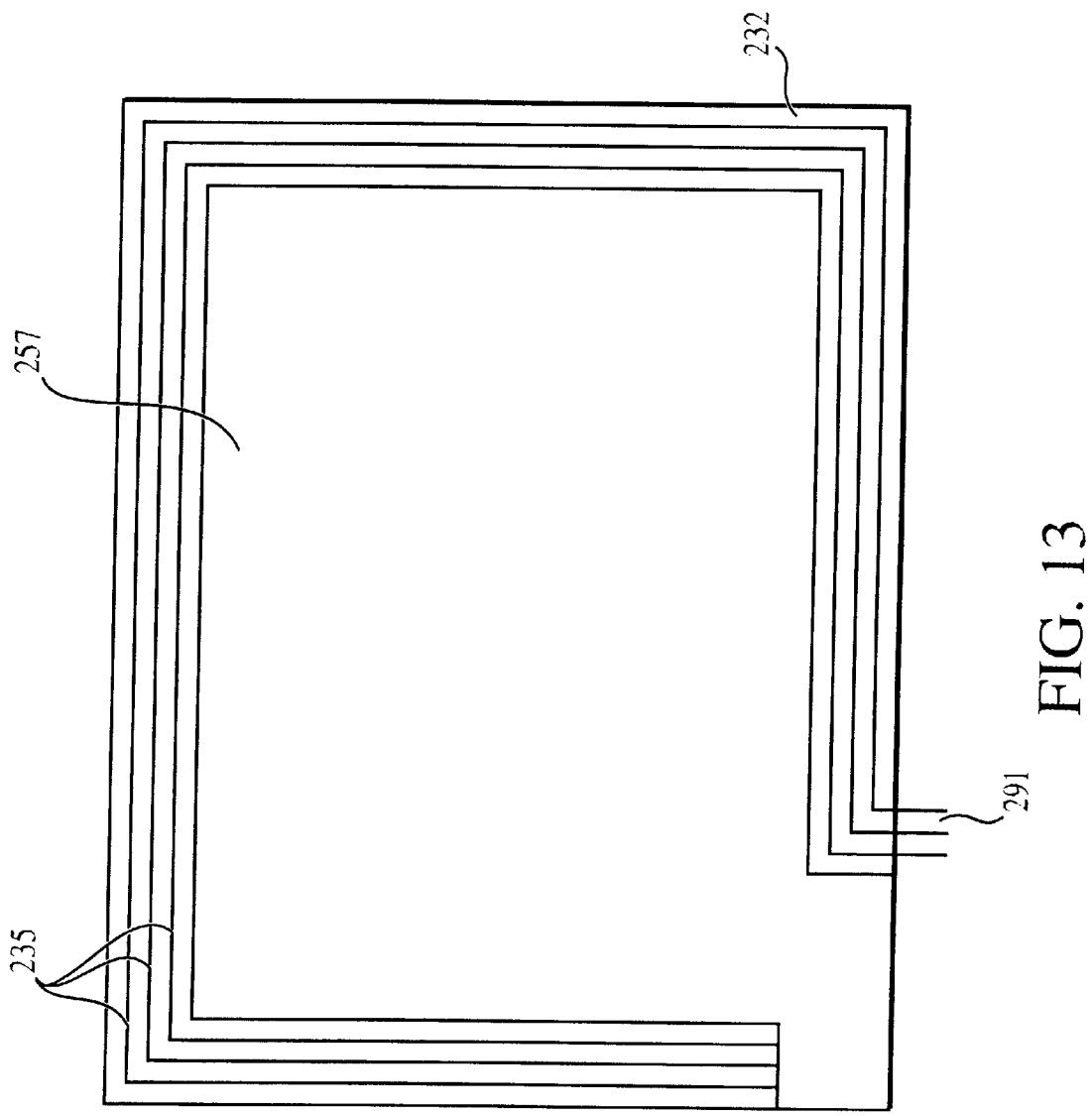
FIG. 13 is a plan view of a portion of an embodiment of a coolant flow field plate.

Moreover, embodiments are also contemplated in which the conductance path of the coolant is increased by increasing the length of the coolant flow path between coolant manifold 257 and coolant inlet region 291. For example, FIG. 13 shows a plan view of an embodiment of a portion of coolant flow field plate 232 in which coolant flows from inlet manifold 257 and first circulates around a portion of coolant flow field plate 232 adjacent the outer periphery of manifold 257 before reaching inlet region 291. At least a portion (e.g., all) of this circulatory portion of the coolant flow field plate (between manifold 257 and inlet region 291) has a groove in it and contains a sealant material. With this arrangement, the coolant conductance path can be further increased by a distance that is equal to the length of the sealant-coated circulatory portion of the path of the coolant between manifold 257 and inlet region 291.

While certain embodiments have been described herein, the invention is not limited to these embodiments. For example, stack 114 can contain bipoloar flow field plates (e.g., with or without one or more of the above-described sealant designs). As another example, a coolant side of a flow field plate need not have channels (e.g., a coolant side of a flow field plate can be flat). As yet another example, the sealant material extending along the coolant inlet manifold can cover at least a portion of the corresponding coolant inlet region and/or the sealant material extending along the coolant outlet manifold can cover at least a portion of the corresponding coolant outlet region. As a further example, an electrically insulating material can be disposed on the surface of the cathode flow field plates, rather than on the surface of the anode flow field plates. As an additional example, the manifolds can be arranged so that the flow of cathode gas can be concurrent with or counter to the flow of anode gas and/or coolant. Likewise, the manifolds can be arranged so that the flow of anode gas is concurrent with or counter to the flow of coolant. Moreover, while a description has been provided in which a sealant material extends into (e.g., along) the coolant manifold, the invention is not limited in this sense. More generally, it is contemplated that any material can be used. Preferably, the material is capable of resulting in an increased coolant conductance path. Furthermore, in embodiments in which a sealant material is used, the sealant material extending into the coolant manifold need not be contiguous with the sealant material used to seal the coolant plates. For example, the sealant material extending into the coolant manifold can be completely separate from the sealant material used to seal the coolant plates, or the sealant material extending into the coolant manifold can be bonded to (e.g., glued, fastened, melted to, etc.) the sealant used to seal the coolant plates.

Other embodiments are in the claims.

What is claimed is:

1. A fuel cell system having a coolant manifold, comprising:
   a first coolant flow field plate having an orifice defining a first portion of the fluid manifold;
   a second coolant flow field plate having an orifice defining a second portion of the fluid manifold; and
   a first electrically insulating material between the first and second coolant flow field plates, the first electrically insulating material extending into the fluid manifold,
   wherein the first electrically insulating material extends into a region between the orifice of the first coolant flow field plate and the orifice of the second coolant flow field plate.

2. The fuel cell system of claim 1, wherein the first coolant flow field plate contacts the second coolant flow field plate.

3. The fuel cell system of claim 2, wherein the first electrically insulating material contacts the first and second coolant flow field plates.

4. The fuel cell system of claim 1, wherein the first electrically insulating material contacts the first and second coolant flow field plates.

5. The fuel cell system of claim 1, wherein the first coolant f low field plate is a first side of a first monopolar flow field plate, a second side of the first monopolar flow field plate being a first reactant flow field plate selected from the group consisting of an anode flow field plate and a cathode flow field plate.

6. The fuel cell system of claim 5, wherein the second coolant flow field plate is a first side of a second monopolar flow field plate, a second side of the second monopolar flow field plate being a second reactant flow field plate selected from the group consisting of an anode flow field plate and a cathode flow field plate, the first reactant flow field plate being different than the second reactant gas flow field plate.

7. The fuel cell system of claim 6, wherein the first electrically insulating material contacts the first and second coolant flow field plates.

8. The fuel cell system of claim 6, wherein the first coolant flow field plate contacts the second coolant flow field plate.

9. The fuel cell system of claim 1, further comprising a second electrically insulating material extending into the coolant manifold.

10. The fuel cell system of claim 9, wherein the second electrically insulating material is between the first sealant material and the second coolant flow field plate.

11. The fuel cell system of claim 10, wherein the second electrically insulating material contacts the first sealant material and the second coolant flow field plate.

12. The fuel cell system of claim 11, wherein the first electrically insulating material contacts the first coolant flow field plate.

13. The fuel cell system of claim 9, further comprising a third coolant flow field plate having an orifice defining a portion of the coolant manifold, the first flow field plate being between the second and third coolant flow field plates.

14. The fuel cell system of claim 13, wherein the first electrically insulating material contacts the second electrically insulating material.

15. The fuel cell system of claim 13, wherein the orifice of the third coolant flow field plate has an edge with a length along the coolant manifold, the orifice of the first coolant flow field plate has an edge with a length along the coolant manifold, the second electrically insulating material extends adjacent the length of the edge of the orifice of the third coolant flow field plate along the coolant manifold, and the second electrically insulating material extends adjacent the length of the edge of the orifice of the first coolant flow field plate along the coolant manifold.

16. The fuel cell system of claim 9, wherein the first electrically insulating material contacts the second electrically insulating material.

17. The fuel cell system of claim 9, wherein the orifice of the second coolant flow field plate has an edge with a length along the coolant manifold, the orifice of the first coolant flow field plate has an edge with a length along the coolant manifold, the second electrically insulating material extends adjacent the length of the edge of the orifice of the second coolant flow field plate along the coolant manifold, and the first electrically insulating material extends adjacent the length of the edge of the orifice of the first coolant flow field plate along the coolant manifold.

18. The fuel cell system of claim 1, wherein the orifice of the coolant flow field plate has an edge with a length along the coolant manifold, and the first electrically insulating material extends adjacent the length of the edge of the orifice of the first coolant flow field plate along the coolant manifold.

19. The fuel cell system of claim 18, wherein the orifice of the second coolant flow has an edge with a length along the coolant manifold, and the first electrically insulating material extends adjacent the length of the edge of the orifice of the second coolant flow field plate along the coolant manifold.

20. The fuel cell system of claim 1, wherein the first electrically insulating material comprises a gasket.

21. The fuel cell system of claim 1, wherein the first electrically insulating material comprises a sealant material.

22. The fuel cell system of claim 21, wherein the sealant material comprises a polymer.

23. The fuel cell system of claim 21, wherein the sealant material comprises a silicone polymer.

24. A fuel cell system having a coolant manifold, comprising:
   a first monopolar flow field plate having an orifice defining a first portion of the coolant manifold, the first monopolar flow field plate having a first side forming a first coolant flow field plate and a second side forming a cathode flow field plate;
   a second monopolar flow field plate having an orifice defining a second portion of the coolant manifold, the second monopolar flow field plate having a first side forming a second coolant flow field plate and a second side forming an anode flow field plate; and
   a sealant material between the first and second coolant flow field plates, the sealant material extending into the coolant manifold,
   wherein the first coolant flow field plate contacts the second coolant flow field plate.

25. The fuel cell system of claim 24, wherein the orifice of the first monopolar flow field plate has an edge with a length along the coolant manifold, and the sealant material extends adjacent the length of the edge of the orifice of the first monopolar flow field plate along the coolant manifold.

26. The fuel cell system of claim 25, wherein the orifice of the second monopolar flow field plate has an edge with a length along the coolant manifold, and the sealant material extends adjacent the length of the edge of the orifice of the second monopolar flow field plate along the coolant manifold.

27. The fuel cell system of claim 26, further comprising a second sealant material extending into the coolant manifold.

28. The fuel cell system of claim 27, wherein the second sealant material is between the first sealant material and the second flow field plate.

29. The fuel cell system of claim 28, wherein the second sealant material contacts the first sealant material and the second flow field plate.

30. The fuel cell system of claim 29, wherein the first sealant material contacts the first flow field plate.

31. The fuel cell system of claim 27, wherein the orifice of the second monopolar flow field plate has an edge with a length along the coolant manifold, the orifice of the first monopolar flow field plate has an edge with a length along the coolant manifold, the second sealant material extends adjacent the length of the edge of the orifice of the second monopolar flow field plate along the coolant manifold, and the first sealant material extends adjacent the length of the edge of the orifice of the first monopolar flow field plate along the coolant manifold.

32. The fuel cell system of claim 27, wherein the first sealant material contacts the second sealant material.

33. A fuel cell system having a coolant manifold, comprising:
a first monopolar flow field plate having an orifice defining a first portion of the coolant manifold, the first monopolar flow field plate having a first side forming a first coolant flow field plate and a second side forming a cathode flow field plate;
a second monopolar flow field plate having an orifice defining a second portion of the coolant manifold, the second monopolar flow field plate having a first side forming a second coolant flow field plate and a second side forming an anode flow field plate;
a third monopolar flow field plate having an orifice defining a portion of the coolant manifold, the third monopolar plate having a first side forming a third coolant flow field plate, the first flow field plate being between the second and third flow field plates; and
a first sealant material between the first and second coolant flow field plates, the sealant material extending into the coolant manifold,
wherein the first coolant flow field plate contacts the second coolant flow field plate.

34. The fuel cell system of claim 33, wherein second coolant flow field plate has an edge with a length along the coolant manifold, and the first sealant material extends adjacent the length of the edge of the orifice of the second coolant flow field plate along the coolant manifold.

35. The fuel cell system of claim 33, wherein the second coolant flow field plate has an edge with a length along the coolant manifold, and the first sealant material extends adjacent the length of the edge of the orifice of the second coolant flow field plate along the coolant manifold.

36. The fuel cell system of claim 33, further comprising a second sealant material.

37. The fuel cell system of claim 36, wherein the first sealant material contacts the second sealant material.

38. The fuel cell system of claim 36, wherein the orifice of the first monopolar flow field plate has an edge with a length along the coolant manifold, the third monopolar flow field plate has an edge with a length along the coolant manifold, the second sealant material extends adjacent the length of the edge of the orifice of the third monopolar flow field plate along the coolant manifold, and the second sealant material extends adjacent the length of the edge of the orifice of the first monopolar flow field plate along the coolant manifold.

39. The fuel cell system of claim 38, wherein the first sealant material extends adjacent an edge of the orifice of the second monopolar flow field plate.

40. The fuel cell system of claim 39, wherein the first sealant material contacts the second sealant material.

41. The fuel cell system of claim 36, wherein the second sealant material contacts the third coolant flow field plate.

42. A fuel cell system having a coolant manifold, comprising:
a first coolant flow field plate having an orifice defining a first portion of the coolant manifold, the orifice of the first coolant flow field plate having an edge with a first length along the coolant manifold;
a second coolant flow field plate having an orifice defining a second portion of the coolant manifold, the orifice of the second coolant flow field plate having an edge with a second length along the coolant manifold;
a fuel cell between the first and second coolant flow field plates, the fuel cell, comprising:
an anode flow field plate having an orifice defining a third portion of the coolant manifold, the orifice of the anode flow field plate having an edge extending a third length along the coolant manifold;
a cathode flow field plate having an orifice defining a fourth portion of the coolant manifold, the orifice of the cathode flow field plate having an edge extending a fourth length along the coolant manifold; and
a proton exchange membrane between the anode and cathode flow field plates; and
a sealant material disposed within the coolant manifold,
wherein a fifth length is defined by the lengths of the edges of the orifices of the first coolant flow field plate, the second coolant flow field plate, the anode flow field plate, the cathode flow field plate along the coolant manifold, and the sealant material extends adjacent at least a portion of the fifth length, and the sealant material extends adjacent all the fifth length.

43. The fuel cell system of claim 42, wherein the first coolant flow field plate and the anode flow field plate define a first monopolar flow field plate.

44. The fuel cell system of claim 43, wherein the second coolant flow field plate and the cathode flow field plate define a second monopolar plate.

45. A fuel cell having a coolant manifold, the fuel cell comprising:
a first monopolar plate having a first side defining a first coolant flow field plate and a second side defining an anode flow field plate;
a second monopolar plate having a first side defining a second coolant flow field plate and a second side defining a cathode flow field plate;
a membrane electrode assembly between the anode and cathode flow field plates; and
a sealant material,
wherein the anode and cathode flow field plates face each other, the membrane electrode assembly contacts the anode flow field plate and the membrane electrode assembly contacts the cathode flow field plate contacts so that a fluid can flow along the coolant manifold from the first coolant flow field plate to the second coolant flow field plate without contacting the anode flow field plate, the cathode flow field plate or the membrane electrode assembly, and
wherein the sealant material is disposed within the coolant manifold so that, when the fluid flows along the coolant manifold from the coolant flow field plate to the second coolant flow field plate, the fluid flows along the sealant material.

46. A fuel cell having a coolant manifold, the fuel cell comprising:
   a first monopolar plate having a first side defining a first coolant flow field plate and a second side defining an anode flow field plate;
   a second monopolar plate having a first side defining a second coolant flow field plate and a second side defining a cathode flow field plate, the anode and cathode flow field plates facing each other;
   a membrane electrode assembly between the anode and cathode flow field plates, the membrane contacting a surface of the anode flow field plate, and the membrane contacting a surface of the cathode flow field plate; and
   sealing means for sealing a flow path along the coolant manifold from the first coolant flow field plate to the second coolant flow field plate.

47. The fuel cell of claim 46, wherein the sealing means is configured so that a fluid can flow along the coolant manifold from the first coolant flow field plate to the second coolant flow field plate without contact the anode flow field plate, the cathode flow field plate or the membrane electrode assembly.

48. A fuel cell system having a coolant manifold, comprising:
   a fuel cell, comprising:
      an anode flow field plate;
      a cathode flow field plate; and
      a membrane electrode assembly between the anode and cathode flow field plates; and
   a first coolant flow field plate having a first electrical potential; and
   a second coolant flow field plate having a second electrical potential different than the first electrical potential,
   wherein the fuel cell is between the first and second coolant flow field plates and the fuel cell system has a coolant conductance path greater than a thickness of the membrane electrode assembly.

49. The fuel cell system of claim 48, wherein the coolant conduct path is greater than a combined thickness of the membrane electrode assembly and the cathode flow field plate.

50. The fuel cell system of claim 48, wherein the coolant conduct path is greater than a combined thickness of the membrane electrode assembly and the anode flow field plate.

51. The fuel cell system of claim 48, wherein the coolant conduct path is greater than a combined thickness of the membrane electrode assembly, the cathode flow field plate and the anode flow field plate.

* * * * *